United States Patent [19]

Goss

[11] Patent Number: 4,750,374
[45] Date of Patent: Jun. 14, 1988

[54] PROCESS AND APPARATUS FOR MONITORING LAMINATE STRUCTURAL STABILITY

[75] Inventor: Raymond W. Goss, Newark, Del.

[73] Assignee: Hercules Incorporated, Wilmington, Del.

[21] Appl. No.: 44,687

[22] Filed: May 1, 1987

Related U.S. Application Data

[63] Continuation-in-part of Ser. No. 919,413, Oct. 16, 1986, abandoned.

[51] Int. Cl.$^4$ ............................................. G01N 19/00
[52] U.S. Cl. ....................................................... 73/866
[58] Field of Search ................... 73/866, 865.6, 866.5, 73/432.1; 33/1 BB, 526, 527, 555, 556, 557, 558, 559, 560, 561, 572, 573, DIG. 20

[56] References Cited

U.S. PATENT DOCUMENTS

| | | | |
|---|---|---|---|
| 2,405,167 | 8/1946 | Royer et al. | 73/865.6 |
| 2,766,624 | 10/1956 | Heffner | 73/865.6 |
| 3,001,291 | 9/1961 | Sjostrom | 33/174 |
| 3,319,338 | 5/1967 | DeNicolo | 33/148 |
| 3,729,985 | 5/1973 | Sikorra | 33/147 |
| 4,206,769 | 6/1980 | Dikstein | 73/866 |
| 4,211,013 | 7/1980 | Bresson et al. | 33/147 |
| 4,410,686 | 10/1983 | Hefner, Jr. et al. | 528/303 |
| 4,476,727 | 10/1984 | Hawk et al. | 73/786 |
| 4,566,335 | 1/1986 | Singhal | 73/161 |
| 4,601,941 | 7/1986 | Lutz et al. | 428/461 |

FOREIGN PATENT DOCUMENTS 0523324  7/1976  U.S.S.R. ............................ 73/865.6

Primary Examiner—Stewart J. Levy
Assistant Examiner—Robert R. Raevis
Attorney, Agent, or Firm—John E. Crowe

[57] ABSTRACT

A method and device for monitoring and evaluating structural stability of a multicomponent laminate body by use of a plurality of oriented sensor fingers, each of which comprises a supporting structure and sensing means secured thereto, the sensing means being capable of anchoring or securing, at one end, to one or more preselected components or subgroup of the laminate body with transversely arranged probing means endwise secured to a laterally movable linking member connected to a recording means for translating relative lateral movements between said components or subgroups under preset conditions into a mechanical or electronic record.

12 Claims, 5 Drawing Sheets

PROCESS AND APPARATUS FOR MONITORING LAMINATE STRUCTURAL STABILITY

This application is a continuation-in-part of U.S. Ser. No. 919,413, filed on Oct. 16, 1986, and now abandoned, and relates to a device and method for monitoring internal stress in multicomponent laminate bodies.

BACKGROUND

Multicomponent laminate bodies, particularly soft laminates such as carpets and carpet tiles, are very difficult to monitor or evaluate with respect to quality under dynamic conditions, particularly test conditions involving changes in ambient temperature and moisture, due to the closed nature of such materials.

For example, relatively heavy extrusion backing and the adhesive layers between the backing and the primary carpet facing of a carpet tile usually supply most of the weight, flexibility and structural integrity of the tile. Production and market demands, however, place a severe limitation on the choice of facing/backing combinations, and also limit the number and amount of environmentally-acceptable adhesives which can be used to bind facing and backing layers under high speed production conditions.

Moreover, commercial production of laminates such as carpet tiles usually requires a pre-stretching of primary facing and backing layers to smooth out wrinkles and obtain even surfaces for application of adhesives and mating of the laminate components.

Unfortunately, very few components enjoy the same elastic properties; as a result, adhesive component layers such as hot melt adhesives cannot be set up or cooled precisely enough at high production speeds to assure minimum tension between laminate components and to achieve a consistent adhesive shear strength.

For quality maintenance purposes, the problem is further compounded by the fact that marginally effective adhesive systems (i.e. primary or secondary adhesive layers of carpet tiles) may be adequate to secure and maintain laminate components under one set of test conditions but fail with less ideally matched laminate components tension-wise under identical conditions. In the later situation, art-recognized tests such as the Aachner test[*1], using statistical analysis of gross external measurements as a criteria over a 100 hour test period, are rarely adequate to evaluate or predict actual or potential quality problems in a meaningful and timely way.

[*1]Deutsche Gutegemeinschaft Texteleboden EV. VIN 54318

It is an object of the present invention to develop an accurate method for monitoring the structural integrity of a laminate body.

It is a further object to obtain a sensitive and reliable device for testing and evaluating stress imposed on components within soft laminate bodies such as carpets and carpet tiles.

THE INVENTION

The above objects are obtained in accordance with the present invention for monitoring structural stability of a laminate body by (a) securing one or more laminate components of a laminate body using securing means such as a probe, as hereafter described, attached to linking means supportably arranged outside of the laminate body, the linking means being, in turn, functionally secured to recording means responsive to movement of the linking means;

(b) exposing the laminate body to change in ambient conditions, such as heat and/or moisture, and (c) translating distortion induced within the laminate body caused by the change in ambient condition into an electronically- or mechanically-induced record by the recording means for comparison with a standard.

The above-described method of the present invention is conveniently embodied in a device capable of monitoring structural stability of a laminate body comprising, in combination, a plurality of sensor fingers commonly secured at one end, each finger of the device having (A) a slotted supporting structure; and
(B) a sensing means mounted to the supporting structure and comprising
  (a) linking means having a proximal and distal end, the linking means being laterally supportably movable with respect to the supporting structure,
  (b) recording means secured, at least in part, to the slotted supporting structure and functionally activated by attachment at the proximal end of the laterally movable linking means, and
  (c) a probing means affixed at the distal end of the linking means and arranged for penetration generally transverse to a plane of motion of one or more components of the laminate, whereby relative movement of one or more preselected component(s) within the laminate body effects movement of the probing means and the attached linking means, thereby translating such movement into one or more electronic- or mechanically-contrived record through such recording means.

The method and device of the present invention are further demonstrated in the following drawings and schematics.

DETAILED DESCRIPTION OF DRAWINGS

Figure 1:
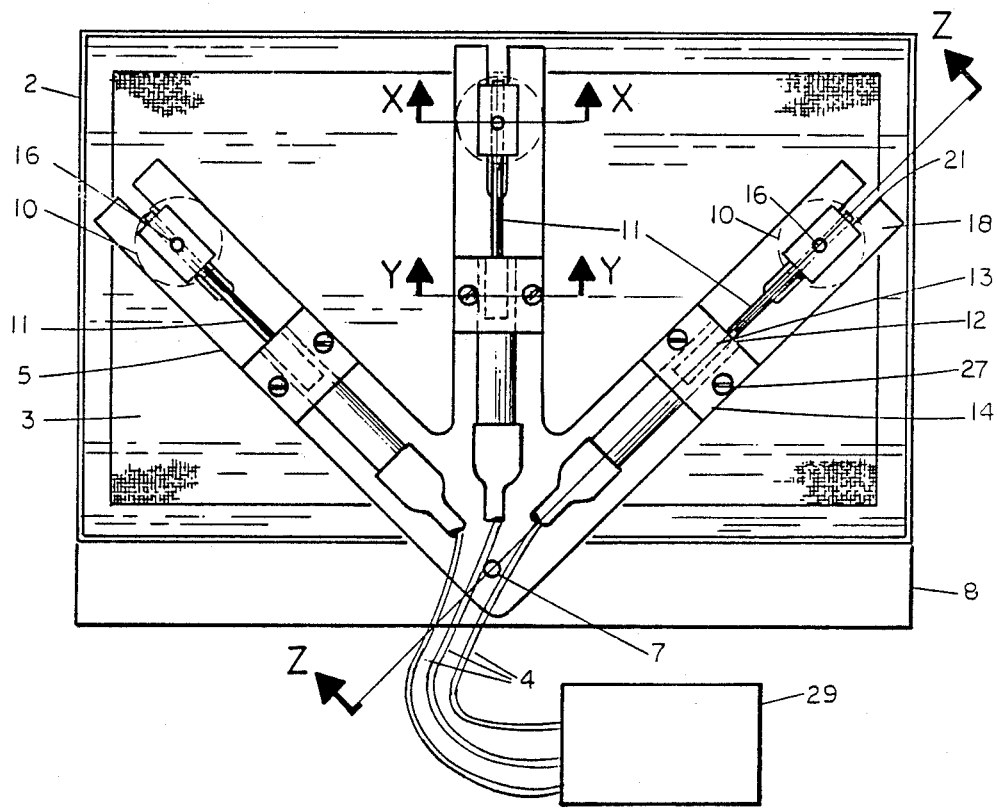
FIG. 1 is a top view of a monitoring device (1) shown partly in phantom, having three sensor fingers (5) individually equipped with caps and two output sensor leads (4), each finger being joined at a fixed common proximal locus marked by vertical supporting column (7), the device being arranged in operating position over a test tank (2) resting on a column base member (8) and containing a laminate body (3) for monitoring or test purposes, to which the device is conveniently secured.

In further reference to FIG. 1 there is shown the top of a threaded vertical supporting column (7) which is endwise fitted or secured (not shown) and acts to support three (3) commonly joined sensor fingers (5) parallel to column base member (8). Column base member (8) supports test tank (2), containing a laminate body (3) anchored into position at the bottom of the tank by ridges or short probes (not shown). Each sensor finger (5) consists of a slotted supporting frame (18) to which is mounted sensing means comprising a probing means (not shown), linking means (11), and recording means (shown only in part and in phantom) incorporated into the middle and proximal end of each finger and by recording device (29) shown schematically, the sensing means of the device consisting of one or more probes of desired length (not shown), threaded into holding block (10) (partly in phantom); the holding block being, in turn, secured to the distal end of linking means (11), by set screw (16); said linking means being supportably adapted for lateral reciprocal movement by threaded attachment at its proximal end (12) to plunger (13) (shown in phantom), the plunger being slideably positioned for insertion within an impedence coil (not shown), said coil being insulated (see FIG. 4) and secured by securing block (14) and holding screws (27) to slotted supporting frame (18). Current flow induced by movement of linking means (11) and plunger (13) is conveniently transformed into current flow and passed through cap and sensory leads (4) to a state-of-the-art recording device (29) such as a movable stylus and paper roll, using a horizontal time axis, or similar arrangement. If desired, such information can be conveniently computerized and recorded as dimensional change on a percentage basis.

Figure 2:
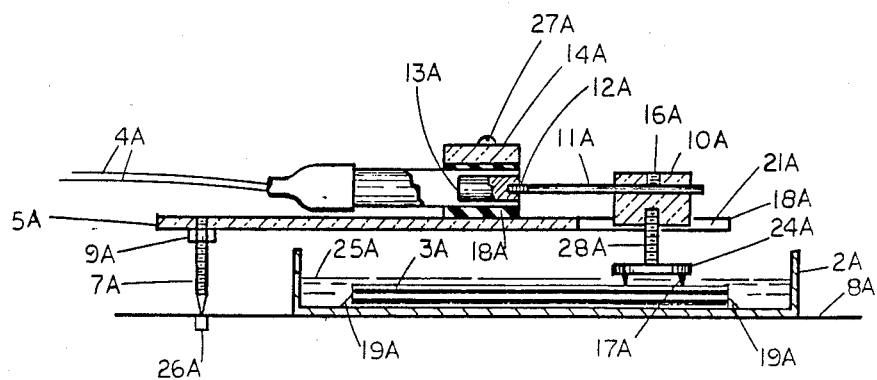
FIG. 2 is a longitudinal schematic section, partly in phantom, and showing a sensor finger (5A) of the type demonstrated in FIG. 1 along line z—z, in an operating position over laminate body (3A), said finger being supported by end threaded vertical supporting column (7A) secured at the opposite end (not shown) in socket (26A) embedded in column base member (8A).

FIG. 2 further demonstrates a sensor finger of the type shown in FIG. 1, identical arabic numbers indicating the same or similar components but with the suffix "A".

In this drawing is shown, in schematic longitudinal section, a pronged probe (17A) of desired length endwise mounted in a probe base or stop (24A), which is, in turn, secured to holding block (10A) by a threaded vertical member (28A) and locked onto linking means (11A) by set screw (16A). The probe, as shown, is superficially positioned onto the upper surface of laminate body (3A), here a carpet tile in face down arrangement, to monitor external warpage or residual tensions from a prior annealing step (see Example); also shown in FIG. 2 are ridges (19A) for positioning the laminate or tile within an optionally water (25A)-filled test tank (2A) which can be positioned in an oven; finger (5A), is shown, endwise supported by a threaded vertical supporting member (7A), inserted at one end (not shown) in socket (26A), the finger (5A) being locked in horizontal position relative to the (3A) and tank (2A) by screwing support column (7A) into arm (5A) and securing with locking nut (9A), allowing for the desired amount of normally induced penetration of probe (17A) into the laminate body; in general, such probe penetration can be varied, depending upon depth of the laminate body components being monitored and by the nature of the particular test being run. For such purpose base (24A) again acts as a stop or collar.

Figure 3:
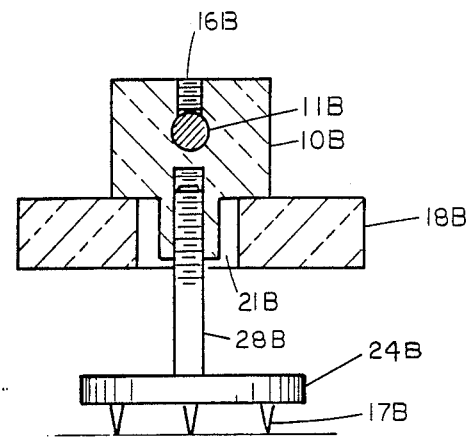
FIG. 3 is a full schematic cross sectional view of a sensor finger of the type shown in FIG. 1 along line x—x.

FIG. 3, is a full cross sectional view along x—x of FIG. 1, showing slotted supporting frame (18B), having slot (21B), through which end-threaded vertical member (28B) connects probe (17B) and probe base (24B) to holding block (10B), which is, in turn, secured onto the distal end of linking means (11B) by set screw (16B).

Figure 4:
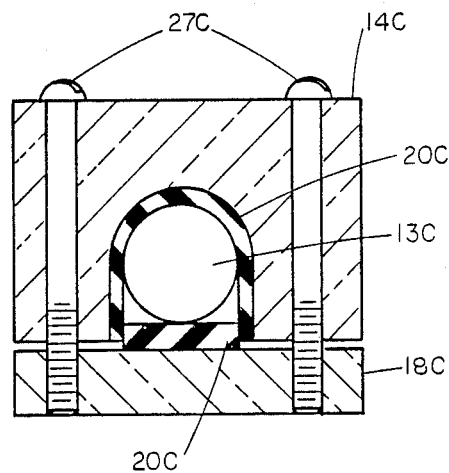
FIG. 4 is a full schematic cross sectional view of a sensor finger of the type shown in FIG. 1 along line y—y.

FIG. 4 is a full cross sectional view along y—y of FIG. 1, showing slotted supporting frame (18C), impedence coil and plunger (in blank schematic) (13C), in which the coil is insulated by rubber pads (20C) and held in place by securing block (14C) and holding screws (27C).

Figure 5:
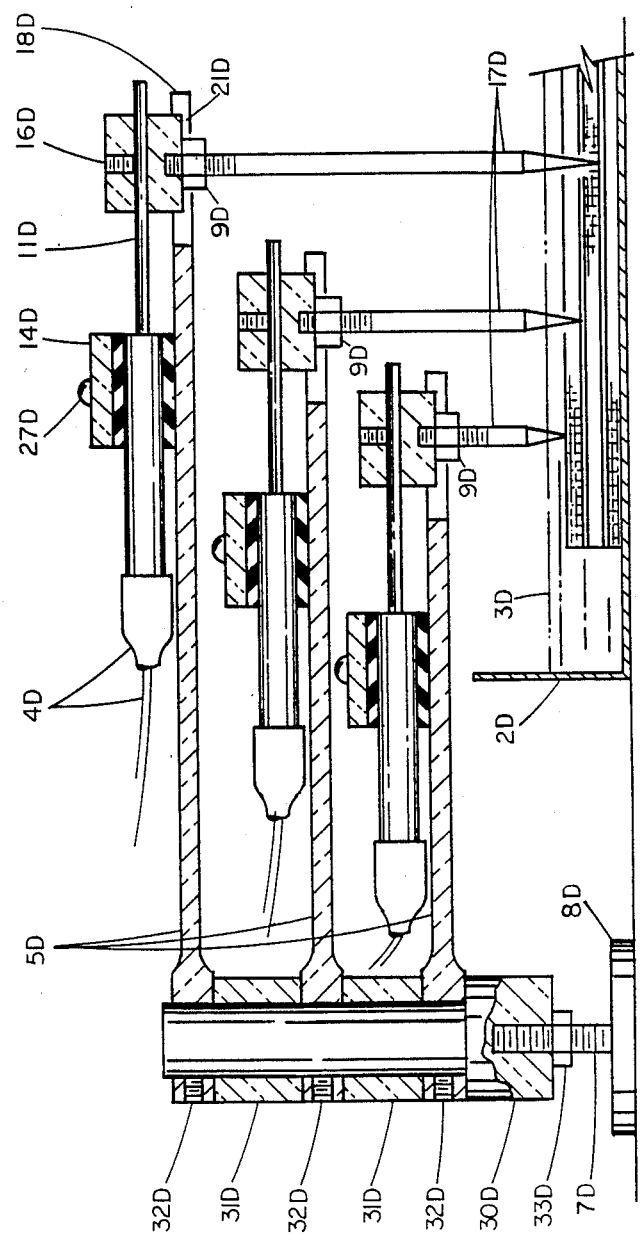
FIG. 5 is a full longitudinal schematic section of a modified version of the monitoring device shown in FIG. 1, in which the three sensor fingers (5D) are of different lengths and separately adjustable with respect to the length of single end threaded probes (17D) to permit simultaneous penetration into different laminate layers or components as desired; this is conveniently accomplished by manual pressure and rotation of probes (17D), use of locking nut (9D), and adjustment to horizontal configuration by use of adjustments in modified threaded vertical supporting column (7D). The depth of probe penetration depends upon the sample orientation (face up or down) of the laminate body and can conveniently be initially adjusted manually with the aid of a collar or stop (not shown) welded a desired distance up the shaft of each probe (17D).

FIG. 5 demonstrates various modifications of the device shown in FIG. 1, in which three (3) sensor fingers (5D) are adjustably swingably arranged from a threaded vertical supporting member (7D) with a base (8D), the fingers being maintained in separate planes by an internally threaded support member (30D) and O-ring spacers (31D), and locked in place using set screws (32D) and lock nut (33D), each finger being of progressively shorter length to permit end-threaded probes (17D) to be positioned at equal or unequal depths within the laminate body (3D) along a preset line or arc and at a desired angle; the bottom layer of the laminate body can again be secured, if desired by probe(s) (not shown) or ridges (19A) welded to the bottom. These act as an anchoring means or control for determination of relative movement or distortions of individual components or groups of laminate body components under predetermined moisture and/or temperature conditions. Such movement, primarily lateral, is again recorded through sensor means and recording means through cap and leads (4D) and a recording device (not shown) similar to FIG. 1.

The three fingered devices shown in FIGS. 1 and 5 are respectively adapted for monoplanar and multiplanar arrangement, the angles between the respective sensor fingers varying usefully from about 0°-60° or higher, again depending upon the nature of the laminate body being tested and the nature of the test desired, using an established or preset "time/current" or % change/temperature graph at predetermined probe depth(s) as a comparative standard.

Preferred positions for such three fingered devices are at 45° with orientation along the length, the width, and on the diagonal of the test laminate or tile, at least one arm preferably being in a machine direction.

As further shown in FIG. 5, the positioning and depth of penetration of each probe can be varied by individual manual adjustment of the threaded probe end and locked in horizontal position with locking nut (9D).

The same or similar component parts are again described in the figures with the same arabic numbers.

Figure 6:
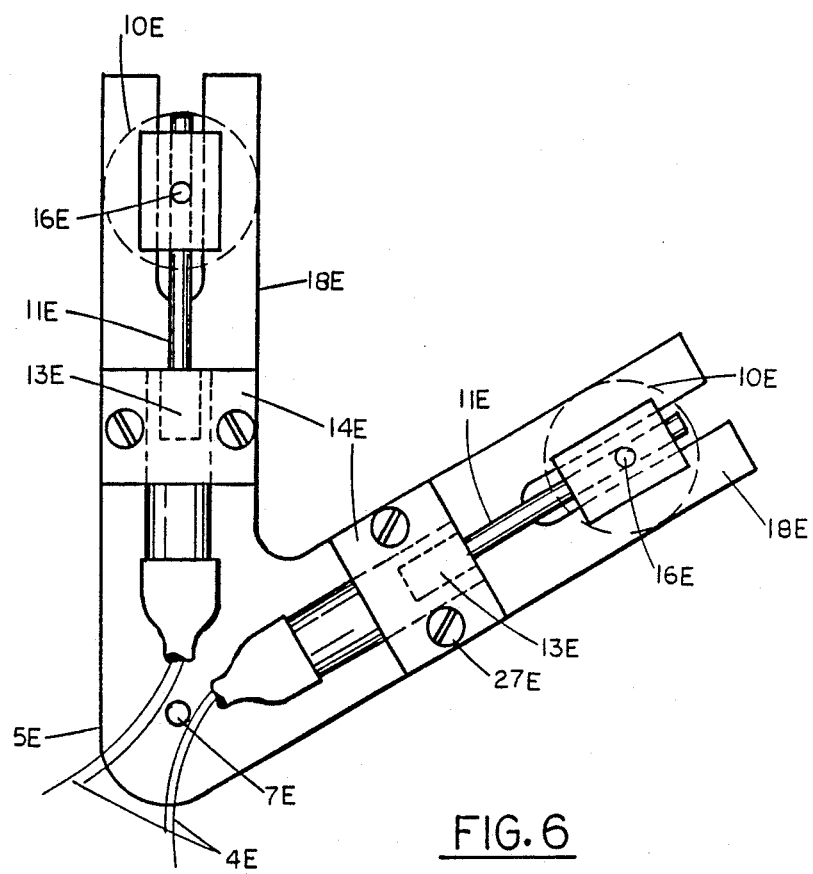
FIG. 6 demonstrates a further modification of the devices shown in FIGS. 1 and 2, in which two sensor fingers are used. The angle between the fingers preferably varies from 45° to 90° although other angles may be used.

FIG. 6 represents a still further modification of FIG. 1 using two instead of three fingers (5E), the angle being conveniently within the range of about 15°–90° and here shown at 45°, in monoplanar arrangement.

Using the above-described device(s) it is now possible to test for overall quality and stability (i.e. residual tension) of multilaminate bodies, particularly soft laminates such as carpet tile. Preferably such tests are carried out with the tile in a face down position, as noted above, although use is not so limited.

By way of example, emersion of a number of carpet tiles for a given length of time (usually 2 hours) in water (a) at ambient, (b) then 73° F. and (c) then at 140° F. temperatures, followed by drying will result in several standard "time/current" test patterns which can, if desired, be used as a much more sensitive substitute for industry-recognized tests such as the above noted Aachner test[*1] or as a control test for determining the effectiveness of carpet production annealing steps to minimize internal tension between laminate components.

EXAMPLE

Figure 7:
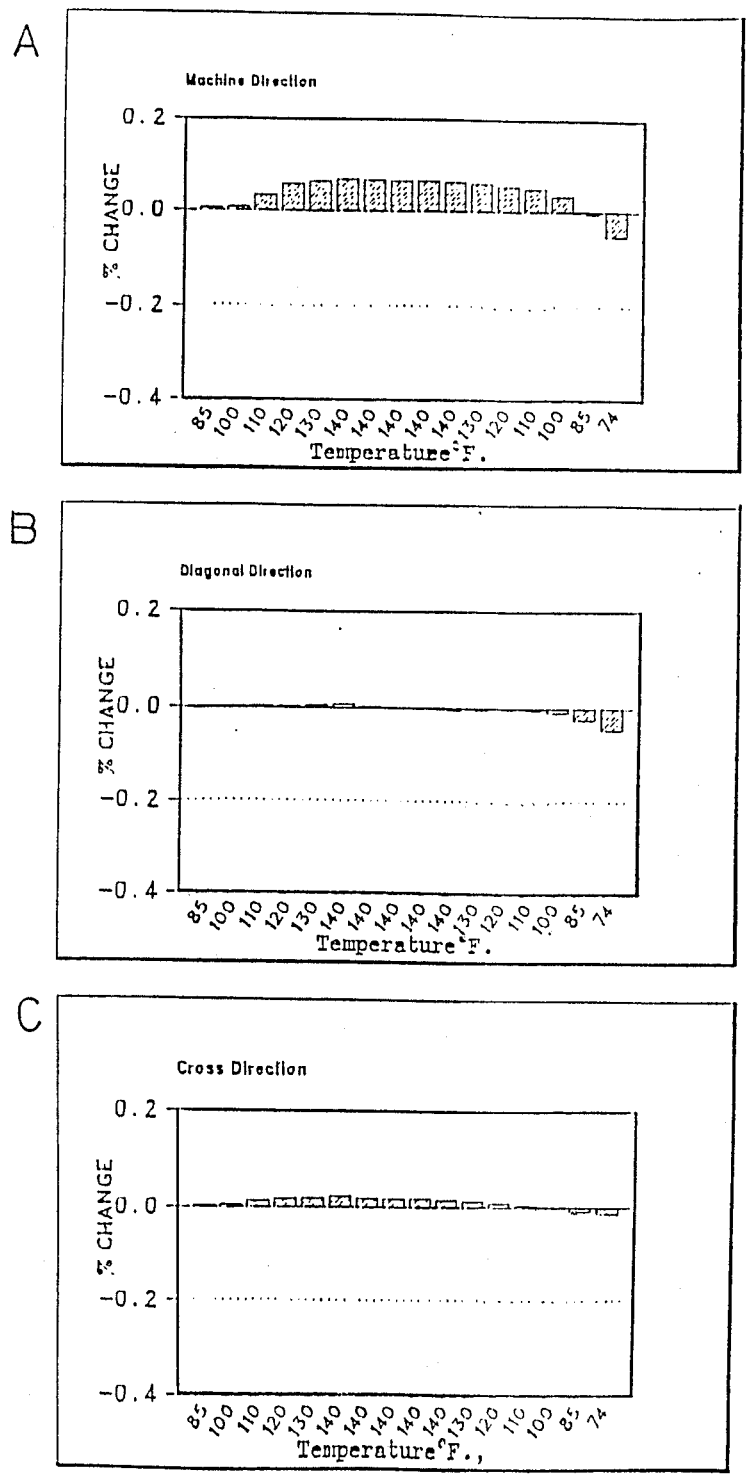
FIGS. 7(A)(B)(C) demonstrates three control graphs representing carpet tile distortion in the machine-, diagonal- and cross direction on a fully annealed carpet tile used as a typical standard for comparison purposes, coil induced current fluctuation here being converted into "% change" in tile dimensions by computerization.

Eight unannealed nylon faced carpet tiles[*2] from the same batch number having EVA-based backing (75 oz/1 yd$^2$) with a standard hot melt adhesive (30 oz/yd$^2$), hereinafter identified as S-1 through S-8, are annealed at 200° F. for periods varying from 5 minutes to 20 minutes, then air cooled to room temperature, and tested, using a testing device essentially the same as that described in FIGS. 1-4 supra, except that no water is utilized in test tank (2) and the device (except recording device (29)) is mounted wholly within a thermostatically-controlled hot air oven. Each test tile is set face down in tank (2) and heated at a rate of about 20° F. per minute up to 140° F. After two (2) hours the oven is cooled at the same rate to ambient temperature. For this test the probes FIG. 2 (17A) are set essentially in the manner shown in FIG. 2 and the results (in a machine direction) are recorded in Table I below as percent change correlated by computer to current fluctuations at various temperatures. For test purposes it is assumed that the heating and cooling phases of a perfectly annealed carpet tile should approximate mirror images (see FIG. 7A) and that differences in % of change during in the cooling phase, compared with the heating phase, are attributed primarily to residual tensions within the tile which have caused slippage.

[*2] Obtained from Burlington Industries, Glasgow, Va., USA

What I claim and desire to protect by Letters Patent is:

1. A method for monitoring structural stability of a laminate body comprising (a) securing one or more laminate components of said laminate body using securing means attached to linking means supportably arranged outside of said laminate body, said linking means being, in turn, functionally secured to recording means responsive to movement of said linking means;

(b) exposing said laminate body to change in ambient condition; and (c) translating distortion induced within said laminate body caused by said change in ambient condition into an electronically- or mechanically-induced record by said recording means for comparison with a standard.

2. A method of claim 1 wherein the step of securing laminate components of said laminate body is effected by perforating said laminate body with said securing means to a predetermined depth in a direction generally transverse to the plane of laminate components to be secured.

3. A method of claim 2 wherein one or more probes are used as securing means.

4. A method of claim 2 wherein an anchoring means is introduced at the opposite side of the laminate body from the securing means.

5. A device for monitoring structural stability of a laminate body comprising, in combination, a plurality of sensor fingers commonly secured at one end, each finger of said device having (A) a slotted supporting structure; and (B) a sensing means mounted to said supporting structure, said sensing means comprising (a) linking means having a proximal and distal end and laterally supportably movable with respect to said supporting structure, (b) recording means secured at least in part to said slotted supporting structure and functionally activated by attachment at the proximal end of said laterally movable linking mean; and (c) a probing means affixed at the distal end of said linking means and arranged for penetration generally transverse to a plane of motion of one or more components of said laminate body, whereby relative movement of one or more preselected components within said laminate body effects movement of said probing means and attached linking means, translating said movement into an electronic- or mechanically-contrived record through said recording means.

6. The device of claim 5 wherein a plurality of sensor fingers are placed in essentially monoplanar arrangement and commonly secured.

TABLE I

| Sample | Annealing Time In Minutes | % Change In Machine Direction[*3] | | | | | | | |
|---|---|---|---|---|---|---|---|---|---|
| | | 85° | 110° | 120° | 140° | 140° | 120° | 110° | 85° |
| S-1 | 0  | +.012 | +.025 | +.037 | +.050 | −.030 | −.110 | −.140 | −.230 |
| S-2 | 0  | +.011 | +.027 | +.035 | +.050 | −.025 | −.100 | −.135 | −.225 |
| S-3 | 5  | +.012 | +.030 | +.045 | +.051 | +.035 | 0     | −.030 | −.125 |
| S-4 | 5  | +.015 | +.135 | +.040 | +.052 | +.040 | +.001 | −.025 | −.130 |
| S-5 | 10 | +.025 | +.050 | +.051 | +.074 | +.095 | +.050 | +.025 | −.065 |
| S-6 | 10 | +.025 | +.045 | +.052 | +.073 | +.100 | +.050 | +.025 | −.070 |
| S-7 | 20 | +.001 | +.025 | +.060 | +.070 | +.065 | +.050 | +.052 | 0     |
| S-8 | 20 | +.005 | +.028 | +.055 | +.065 | +.070 | +.050 | +.050 | −.001 |

[*3] "+" indicates title expansion "−" indicates contraction from initial ambient condition based on oven readings in degrees F.

7. The device of claim 6 wherein three sensor fingers are utilized at an angle of not less than about 30°.

8. The device of claim 6 wherein the sensing means for each finger generates an impedence current by movement of the proximal end of said linking means and attached plunger through a coil.

9. The device of claim 5, wherein a plurality of sensor fingers of unequal length are arranged along parallel planes and commonly secured.

10. The device of claim 5 wherein the probing means is a needle-like element arranged in general transverse direction to one or more components of said laminate body.

11. The device of claim 5 wherein the laminate body is secured with anchoring means inserted in said laminate body.

12. The device of claim 11 wherein the anchoring means is a needle-like element arranged in general transverse direction to one or more components of said laminate body.

* * * * *